(12) United States Patent
Meinders et al.

(10) Patent No.: US 7,935,403 B2
(45) Date of Patent: *May 3, 2011

(54) OPTICAL MASTER SUBSTRATE AND METHOD TO MANUFACTURE HIGH-DENSITY RELIEF STRUCTURE

(75) Inventors: Erwin Rinaldo Meinders, Eindhoven (NL); Rolf Antonie Loch, Enschede (NL)

(73) Assignee: Kkoninklijke Philips Electronics N.V., Eindhoven (NL)

( * ) Notice: Subject to any disclaimer, the term of this patent is extended or adjusted under 35 U.S.C. 154(b) by 841 days.

This patent is subject to a terminal disclaimer.

(21) Appl. No.: 10/599,834

(22) PCT Filed: Apr. 8, 2005

(86) PCT No.: PCT/IB2005/051160
§ 371 (c)(1),
(2), (4) Date: Oct. 11, 2006

(87) PCT Pub. No.: WO2005/101397
PCT Pub. Date: Oct. 27, 2005

(65) Prior Publication Data
US 2007/0184233 A1    Aug. 9, 2007

(30) Foreign Application Priority Data
Apr. 15, 2004  (EP) .................................... 04101561

(51) Int. Cl.
*B32B 3/02* (2006.01)
(52) U.S. Cl. ..................... 428/64.1; 428/64.4; 428/64.5; 430/270.13
(58) Field of Classification Search ........................ None
See application file for complete search history.

(56) References Cited

U.S. PATENT DOCUMENTS

| 4,732,844 | A | * | 3/1988 | Ota et al. ....................... 430/322 |
| 5,051,340 | A | * | 9/1991 | Tyan et al. ..................... 430/321 |
| 6,030,556 | A | * | 2/2000 | DePuydt et al. ............. 264/1.37 |
| 6,219,330 | B1 | * | 4/2001 | Ahn et al. ................... 369/275.1 |
| 6,709,801 | B2 | * | 3/2004 | Miyamoto et al. ........ 430/270.13 |
| 2002/0018870 | A1 | | 2/2002 | Meinders et al. |
| 2003/0134229 | A1 | | 7/2003 | Yasuda et al. |
| 2003/0137065 | A1 | | 7/2003 | Medower et al. |

FOREIGN PATENT DOCUMENTS

| EP | 1065663 A2 | 1/2001 |
| EP | 1102254 A1 | 5/2001 |
| WO | 2004023462 A1 | 3/2004 |
| WO | 2005101397 A1 | 10/2005 |

OTHER PUBLICATIONS

Written Opinion of the Intenational Searching Authority PCT/IB2005/051160.
ISR, International Search Report PCT/IB2005/051160-WO.

* cited by examiner

*Primary Examiner* — Elizabeth Mulvaney (57) ABSTRACT

The invention relates to a master substrate, a method for making a high density relief structure, and optical discs replicated with the high-density relief structure, the master substrate comprising a substrate layer (10) and a recording stack deposited on the substrate layer, the recording stack comprising:—an information layer (12),—an interface layer (11) sandwiched between said information layer and the substrate , forming marks and spaces representing an encoded data pattern, wherein said recording material is an alloy comprising at least two materials of the group of materials containing Ge, Sb, Te, In, Se, Bi, Ag, Ga, Sn, Pb, As. A very high-density relief structure is achieved.

28 Claims, 9 Drawing Sheets

OPTICAL MASTER SUBSTRATE AND METHOD TO MANUFACTURE HIGH-DENSITY RELIEF STRUCTURE

The present invention relates to an optical master substrate for manufacturing a high-density relief structure. Such a relief structure can, for example, be used as a stamper for mass-replication of read-only memory (ROM) and pre-grooved write-once (R) and rewritable (RE) discs. The invention relates further to a method of making such a high-density relief structure. The invention relates further to the optical discs made with the processed optical master substrate.

Optical record carriers have seen an evolutionary increase in the data capacity by increasing the numerical aperture of the objective lens and a reduction of the laser wavelength. The total data capacity was increased from 650 Mbyte (CD, NA=0.45, $\lambda$=780 nm) to 4.7 Gbyte (DVD, NA=0.65, $\lambda$=670 nm) to 25 Gbyte for the Blu-ray Disc (BD, NA=0.85, $\lambda$=405 nm). Optical record carriers can be of the type write-once (R), rewritable (RE) and read-only memory (ROM). The great advantage of ROM discs is the cheap mass replication, and therefore the cheap distribution of content such as audio, video and other data. Such a ROM disc is, for example, a polycarbonate substrate with tiny replicated pits (holes). The pits in a replicated disc can typically be made with injection molding or a similar kind of replication process. The manufacturing of a stamper, as used in such a replication process, is known as mastering.

In conventional mastering, a thin photosensitive layer, spin-coated on a glass substrate, is illuminated with a modulated focused laser beam. The modulation of the laser beam causes that some parts of the disc are being exposed by UV light while the intermediate areas in between the pits remain unexposed. While the disc rotates, and the focused laser beam is gradually pulled to the outer side of the disc, a spiral of alternating illuminated areas remains. In a second step, the exposed areas are being dissolved in a so-called development process to end up with physical holes inside the photo-resist layer. Alkaline liquids such as NaOH and KOH are used to dissolve the exposed areas. The structured surface is subsequently covered with a thin Ni layer. In a galvanic process, this sputter-deposited Ni layer is further grown to a thick manageable Ni substrate with the inverse pit structure. This Ni substrate with protruding bumps is separated from the substrate with unexposed areas and is called the stamper.

ROM discs contain a spiral of alternating pits and lands representing the encoded data. A reflection layer (metallic or other kind or material with different index of refraction coefficient) is added to facilitate the readout of the information. In most of the optical recording systems, the data track pitch has the same order of magnitude as the size of the optical readout/write spot to ensure optimum data capacity. Compare for example the data track pitch of 320 nm and the 1/e spot radius of 305 nm (1/e is the radius at which the optical intensity has reduced to 1/e of the maximum intensity) in case of Blu-ray Disc. In contrary to write-once and re-writable optical record carriers, the pit width in a ROM disc is typically half of the pitch between adjacent data tracks. Such small pits are necessary for optimum readout. It is well known that ROM discs are readout via phase-modulation, i.e. the constructive and destructive interference of light rays. During readout of longer pits, destructive interference between light rays reflected from the pit bottom and reflected form the adjacent land plateau occurs, which leads to a lower reflection level.

To make pits of approximately half the optical readout spot, a laser with a lower wavelength than used for readout is typically used for mastering of the pit structure. For CD/DVD mastering, the Laser Beam Recorder (LBR) typically operates at a wavelength of 413 nm and numerical aperture of the objective lens of NA=0.9. For BD mastering, a deep UV laser with 257 nm wavelength is used in combination with a high NA lens (0.9 for far-field and 1.25 for liquid immersion mastering). In other words, a next generation LBR is required to make a stamper for the current optical disc generation. An additional disadvantage of conventional photoresist mastering is the cumulative photon effect. The degradation of the photo-sensitive compound in the photoresist layer is proportional to the amount of illumination. The sides of the focused Airy spot also illuminates the adjacent traces during writing of pits in the central track. This multiple exposure Leads to local broadening of the pits and therefore to an increased pit noise (jitter). Also for reduction of cross-illumination, an as small as possible focused laser spot is required. Another disadvantage of photoresist materials as used in conventional mastering is the length of the polymer chains present in the photoresist. Dissolution of the exposed are as leads to rather rough side edges due to the long polymer chains. In particular in case of pits (for ROM) and grooves (for pre-grooved substrates for write-once (R) and rewritable (RE) applications) this edge roughness may lead to deterioration of the readout signals of the pre-recorded ROM pits and recorded R/RE data.

It is an object of the invention to provide a master substrate for manufacturing a high-density and high precision relief structure, for example, for mass-replication of high-density read-only memory (ROM) and recordable (R/RE) discs. This has the advantage of a better signal quality of the pre-recorded data in ROM discs and a qualitatively better pre-groove for improved data recording (R/RE). A further object of the invention is to provide a method of manufacturing such a high-density relief structure. Another further object of the invention is to provide optical discs with a high density pre-recorded data structure.

The object is achieved by providing a master substrate with growth-dominated phase-change materials as claimed in claim 1 comprising a substrate layer and a recording stack, the recording stack comprising:
    an information layer,
    an interface layer sandwiched between said information layer and the substrate, said information layer comprising a growth-dominated phase-change material for forming marks and spaces representing an encoded pattern, wherein said recording material is an alloy comprising at least two materials of the group of materials containing Ge, Sb, Te, In, Se, Bi, Ag, Ga, Sn, Pb, As.

Preferred embodiments of the master substrate are defined in the dependent claims.

In a preferred embodiment, claimed in claim 2, the master substrate comprises a Sb—Te alloy material doped with Ge and In as recording material, in particular $Sb_2Te$ doped with Ge and In. In another preferred embodiment, claimed in claim 3, the master substrate comprises a Sn—Ge—Sb-alloy material, in particular with the composition $Sn_{18.3}$—$Ge_{12.6}$—$Sb_{69.2}$. The claimed phase-change materials lead to so-called re-crystallisation in the tail of the mark enabling the further reduction of the channel bit length, and thus the tangential data density. The thickness range for the information layer as claimed in claim 1 is defined in claim 4, namely 2-100 nm, preferably 10-40 nm or 45-70 nm. The master substrate with information layer with thickness in the range 10-40 nm is used to make a pre-grooved relief structure used for replication of write-once (R) and re-writable (RE) discs. The range 45-70 nm is particularly suited for making a high-density relief structure for read-only memory discs.

The preferred materials for the interface layer are claimed in claim 5, 6 and 7. Claim 5 discloses the use of dielectric materials, such as ZnS—SiO$_2$, Al$_2$O$_3$, SiO$_2$, Si$_3$N$_4$, as interface in the master substrate as claimed in claim 1. Claim 6 discloses the use of organic materials of the group dye materials containing phthalo-cyanine, cyanine and AZO dyes, as interface layer in the master substrate. Claim 7 discloses the use of organic materials from the group of UV-cured organic materials, preferably hexandioldiacrylate (HDDA) as interface layer in the master substrate. The preferred thickness of the interface layer (11) ranges from 5 nm to 100 nm, in particular between 20 and 70 nm, and is disclosed in claim 8.

In a preferred embodiment, the recording stack of the master substrate as claimed in claim 1, farther comprises a protection layer adjacent the information layer (12) at a side most remote from the substrate. The preferred thickness of this protection layer, disclosed in claim 10, is between 2 and 50 nm, in particular between 5 and 30 nm. The preferred materials are disclosed in claim 11 and 12. Claim 11 proposes the use of dielectric materials such as ZnS—SiO$_2$, Al$_2$O$_3$, SiO$_2$, Si$_3$N$_4$, Ta$_2$O, SiC. Claim 12 proposes the use of organic photoresist materials, in particular selected from the group Diazonaphthoquinono-based resists. Furthermore, the use of soluble organic materials, such as PMMA is disclosed. The protection layer is particularly advantageous to prevent large scale migration of molten phase-change material. This effect will be discussed later in the application. The protection layer needs to be resistant to the high recording temperatures that are encountered during writing the high-density relief structure in the master substrate. Another important requirement is the ability to remove this layer via etching with the proposed etching liquids. Other solvents are also possible to remove the cover layer, such as acetone, iso-propanol Even mechanical pealing off the protection layer is a possibility to remove it from the master substrate after recording.

In another preferred embodiment, the master substrate as claimed in claim 1 further comprises a second interface layer between the substrate layer and the interface layer, i.e not facing the incident laser light. This interface layer preferably has a high resistance to the etching liquid such that this second interface acts as a natural barrier. The depth of the etched grooves and other relief structure is determined by the thickness of the information layer and the first interface layer. The thickness of the second interface layer is claimed in claim 14.

In another preferred embodiment, the master substrate as claimed in claim 1, 9 or 13 farther comprises a metal heat sink layer between the substrate layer and the interface layer in case the recording stack comprises a second interface layer, not facing the incident laser light. The metal heat sink is added for quick heat removal during recording of data. At the same time the metal heat sink layer can also serve as a reflector to enhance the absorption of the incident laser beam by the recording layer. The preferred thickness of the metallic layer is larger than 5 nm, in particular larger than 15 nm. The metal heat sink layer is made of a material or an alloy based on a material of the group of materials containing Al, Ag, Cu, Ag, Ir, Mo, Rh, Pt, Ni, Os, W.

The object is further achieved by providing a method of manufacturing a stamper for replicating a high-density relief structure comprising at least the steps of
- illuminating a master substrate as claimed in any one of claims 1-17 with a modulated focused radiation beam,
- rinsing the illuminated master substrate layer with a developer, being one of an alkaline or an acid liquid, preferably selected of the group of solutions of NaOH, KOH, HCl and HNO$_3$ in water, such that a desired relief structure results,
- sputter-deposition of a metallic layer, in particular a Nickel layer,
- galvanically growing the sputter-deposited layer to the desired thickness forming a stamper,
- separating the master substrate from the stamper.

A method as claimed in claim 18 using a master substrate as claimed in claims 1, 9, 13 or 15, the information layer having a thickness in the range 5-35 nm wherein a pre-grooved shaped relief structure is formed for replication of write-once (R) and rewritable (RE) optical discs is disclosed in claim 19.

A method as claimed in claims 18 or 19, in which the developer solution is used in a concentration 1-30%, preferably between 2 and 20% is claimed in claim 20.

Claim 21 discloses a pre-recorded optical disc replicated with the stamper manufactured with the method of any one of claims 18, 19 or 20, characterized in that the relief structure on the stamper surface comprises shortest pits having a typical crescent and longer pits having a swallow-shaped trailing edge and that the relief structure is replicated in the optical disc.

The invention will now be explained in more detail with reference to the drawings in which.

Phase-change materials are applied in the well-known re-writable disc formats, such as DVD+RW and the recently introduced Blu-ray Disc (BD-RE). Phase-change materials can change from the as-deposited amorphous state to the crystalline state via laser heating. In many cases, the as-deposited amorphous state is made crystalline prior to recording of data. The initial crystalline state can be made amorphous by lased induced heating of the thin phase-change layer such that the layer melts. If the molten state is very rapidly cooled down, a solid amorphous state remains. The amorphous mark (area) can be made crystalline again by heating the amorphous mark to above the crystallisation temperature.

These mechanisms are known from rewritable phase-change recording. The applicants have found that, depending on the heating conditions, a difference in etch velocity exists between the crystalline and amorphous phase. Etching is known as the dissolution process of a solid material in an alkaline liquid, acid liquid, or other type or solvent. The difference in etch velocity leads to a relief structure. Suitable etching liquids for the claimed material classes are alkaline liquids, such as NaOH, KOH and acids, such as HCl and HNO3. The relief structure can, for example, be used to make a stamper for the mass replication of optical read-only ROM discs and pre-grooved substrates for write-once and re-writable discs. The obtained relief structure can also be used for high-density printing of displays (micro-contact printing).

Figure 1:
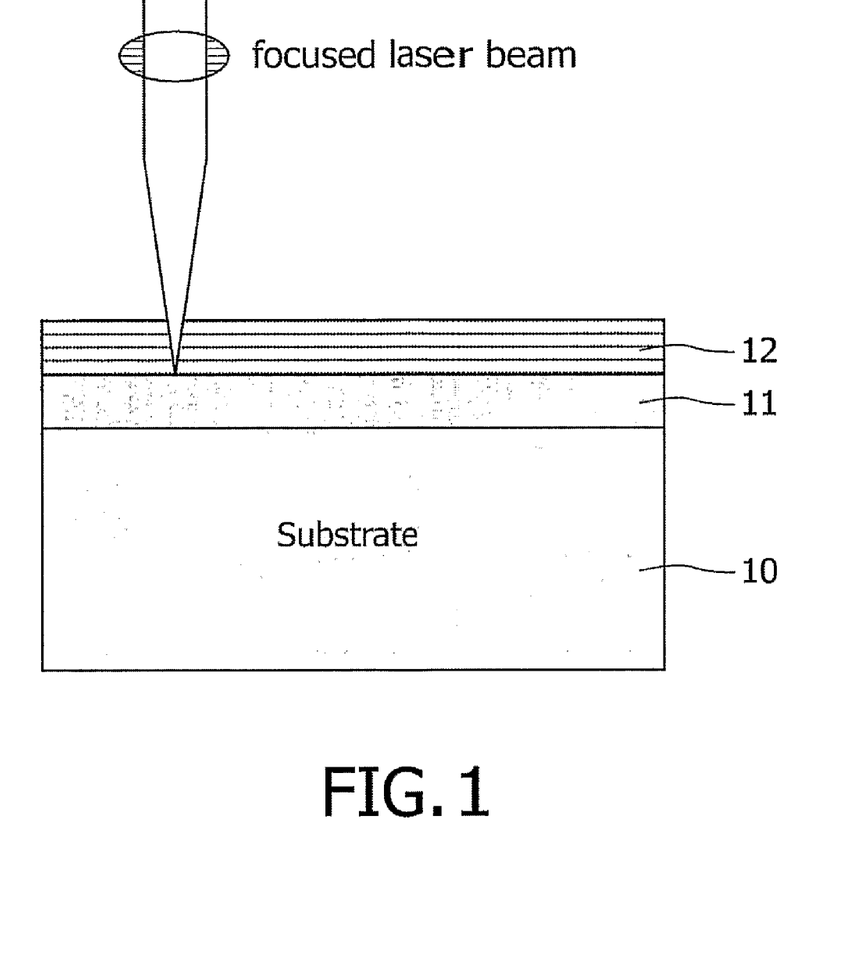
FIG. 1 shows the basic layout of the master substrate.

The basic layout of the master substrate is given in FIG. 1. In FIG. 1 the master substrate proposed according to the present invention essentially comprises an information layer (12) made of phase-change material and an interface layer (11) sandwiched between said information layer (12) and the substrate (10). The phase-change material for use as recording material in said information layer is selected based on the optical and thermal properties of the material such that it is suitable for recording using the selected wavelength. In case the master substrate is initially in the amorphous state, crystalline marks are recorded during illumination. In case the recording layer is initially in the crystalline state, amorphous marks are recorded. During developing, one of the two states is dissolved in the alkaline or acid liquid to result in a relief structure.

Figure 2:
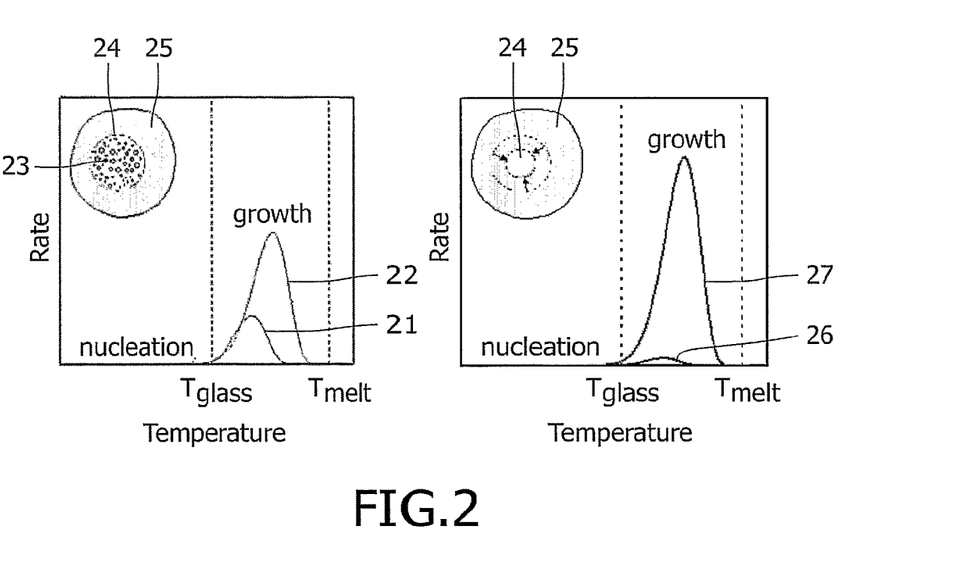
FIG. 2 shows nucleation and growth probabilities curves of two classes of phase-change materials: growth-dominated and nucleation-dominated phase-change materials.

Phase-change compositions can be classified into nucleation-dominated and growth-dominated materials. Nucleation-dominated phase-change materials have a relative high probability to form stable crystalline nuclei from which crystalline marks can be formed. On the contrary, the crystallisation speed is typically low. An example of nucleation dominated materials are Ge1Sb2Te4 and Ge2Sb2Te5 materials. Growth-dominated materials are characterized by a low nucleation probability and a high growth rate. Example of growth-dominated phase-change compositions are the disclosed compositions $Sb_2Te$ doped with In and Ge and SnGeSb alloy. The nucleation and growth probability curves of these two classes of phase-change materials are shown in FIG. 2. The left panel shows the crystallisation characteristics of a nucleation-dominated phase-change material. (21) indicates the probability of nucleation, (22) indicates the probability of growth. The material possesses a relatively high probability to form stable nuclei from which the amorphous material can crystallize to a polycrystalline mark. This re-crystallisation process is illustrated in the insert of the figure. The process of crystallisation from stable nuclei (23) of an amorphous mark (24) in a crystalline background (25) is schematically shown. The right panel shows the crystallisation characteristics of a growth-dominated phase-change material. (26) indicates the probability of nucleation, (27) indicates the probability of growth. These materials have a relatively low probability to form stable crystalline nuclei from which crystalline marks can be formed. On the contrary, the growth velocity is large such that re-crystallisation can be fast in case an amorphous-crystalline interface is present. The process is illustrated in the insert of the figure as well. The amorphous mark (24) re-crystallises via growth form the crystalline-amorphous interface.

In case crystalline marks are written in an initial amorphous layer, typical marks remain that are conform the shape of the focussed laser spot. The size of the crystalline mark can somewhat be tuned by controlling the applied laser power, but the written mark can hardly be made smaller than the optical spot. In case amorphous marks are written in a crystalline layer, the crystallisation properties of the phase-change material allow for a mark that is smaller than the optical spot size. In particular in case growth-dominated phase-change materials are used, re-crystallisation in the tail of the amorphous mark can be induced by application of proper laser levels at proper time scales relative to the time at which the amorphous mark is written.

Figure 3:
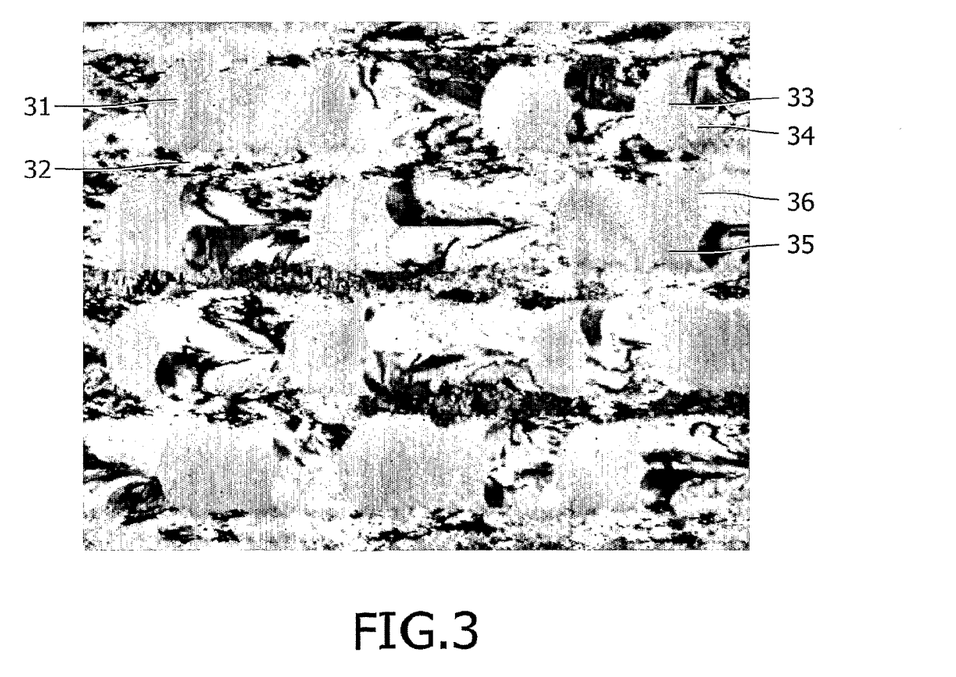
FIG. 3 shows a Transmission Electron Microscopic (TEM) picture of written amorphous marks in an optical record carrier based on a fast-growth phase-change material.

This re-crystallisation process is elucidated in FIG. 3. Shown is a Transmission Electron Microscopy (TEM) picture of amorphous marks (31) written in a crystalline background layer (32). The used phase-change material was a growth-dominated phase-change material, specifically a Sb2Te composition doped with In and Ge. The shortest marks (33) are characterized by a so-called crescent shape due to the re-crystallisation induced in the trailing edge of the mark (34). The longer marks (35) show similar re-crystallisation behaviour in the trailing edge (36), also leading to shortening of the marks. This re-crystallisation enables the writing of marks smaller than the optical spot size.

Figure 4:
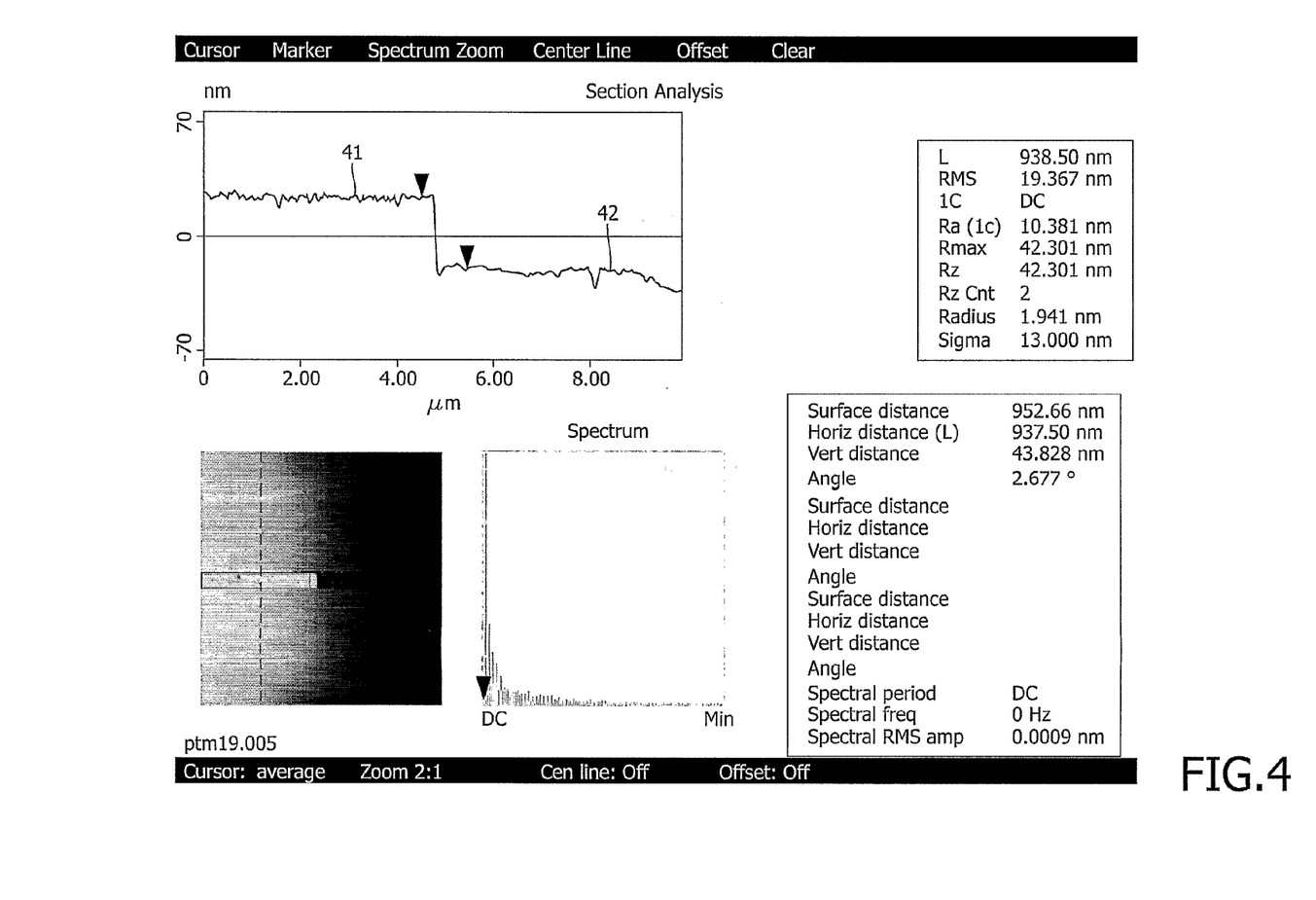
FIG. 4 shows an atomic force microscopy (AFM) picture of a relief structure illustrating the difference in etching velocity of the amorphous and crystalline phase.

A difference in dissolution rate of the amorphous and crystalline state is made visible in FIG. 4. The figure shows an atomic force microscopic picture of a relief structure that is obtained after rinsing a phase-change film, partly in the crystalline and partly in the amorphous state, with an alkaline solution (10% NaOH) for 10 minutes. The left plateau (41) refers to the initial (amorphous) state of the phase-change film. The right plateau (42) is the written (crystalline) state. A smooth step is found, which illustrates a good contrast in dissolution rate between the amorphous and crystalline phase of the used phase-change material ($Sb_2Te$ doped with In and Ge).

Figure 5A:
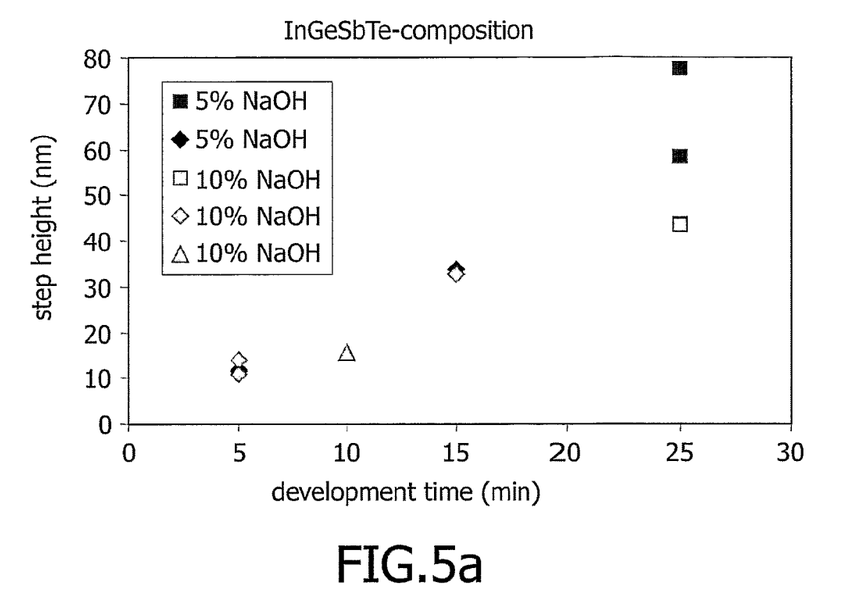
FIG. 5 shows the measured residual layer thickness as a function of the total dissolution time for an InGeSbTe phase-change composition in case NaOH is used as developer.
Figure 5B:
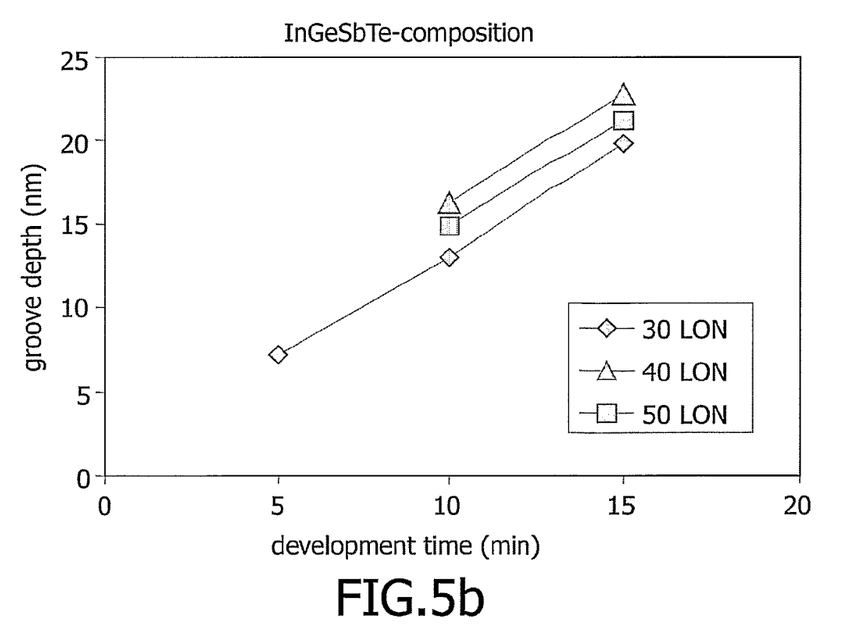
Figure 5C:
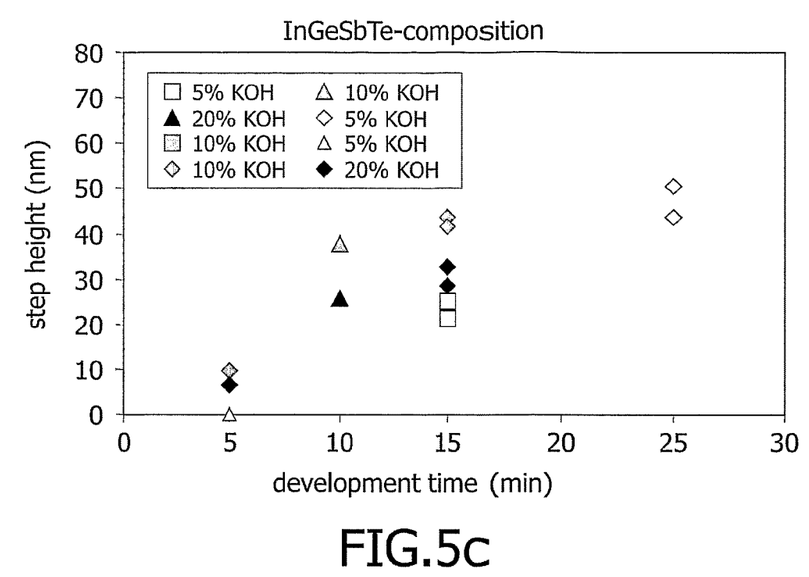

Measured dissolution rates are shown in FIG. 5 for a $Sb_2Te$ composition doped with In and Ge. FIG. 5a shows the measured residual layer thickness as a function of the total dissolution time for 5% and 10% concentrated NaOH solution. The slope of the curve denotes the dissolved layer thickness per unit time, which is denoted as the dissolution rate. For 5% NaOH, the dissolution rate is about 2 nm/minute for this particular InGeSbTe composition. For 10% NaOH, the dissolution rate is about 1.5 nm/minute for this particular InGeSbTe composition. FIG. 5b plots the measured groove depth as a function of the total dissolution time for 10% NaOH. The grooves were written with a laser beam recorder (LBR). Measurements are shown for three different laser powers (indicated with LON). The dissolution rate is also 1.5 nm/minute. FIG. 5c plots the measured groove depth as a function of the total dissolution time for 5, 10 and 20% KOH solution. The dissolution rate is about 1.3 nm/minute for 5% KOH, about 2 nm/minute for 20% KOH and about 3 nm/minute for 10% KOH.

Figure 6:
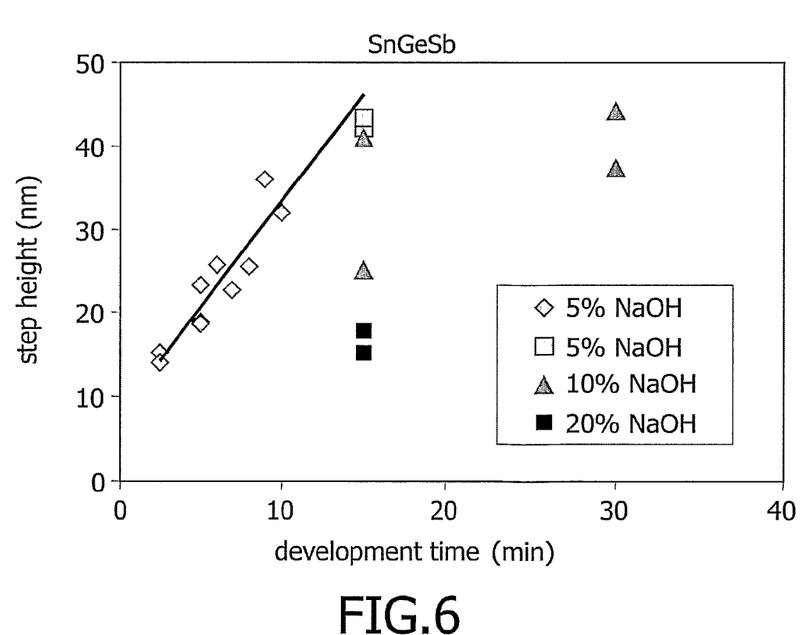
FIG. 6 shows the measured residual layer thickness as a function of the total dissolution time for a SnGeSb phase-change composition in case NaOH is used as developer.

The measured residual layer thickness as a function of the total dissolution time for 5%, 10% and 20% concentrated NaOH solution are given in FIG. 6 for a SnGeSb composition. The slope of the curve denotes the dissolved layer thickness per unit time, which is denoted as the dissolution rate. For 5% NaOH, the dissolution rate is about 2.3 nm/minute for this particular SnGeSb composition.

Figure 7:
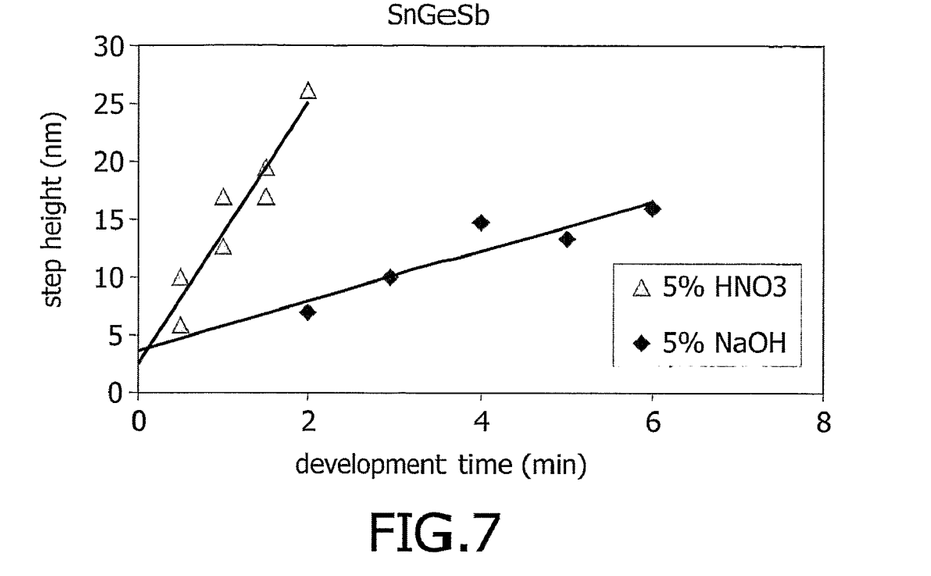
FIG. 7 shows the measured residual layer thickness as a function of the total dissolution time for a SnGeSb phase-change composition in case NaOH and HNO3 are used as developer.

The measured residual layer thickness as a function of the total dissolution time for 5% HNO3 is compared to 10% NaOH in FIG. 7 for the SnGeSb composition. The dissolution rate of HNO3 is much higher than that for NaOH, namely 12 nm/minute versus 2.3 nm/minute.

Figure 8:
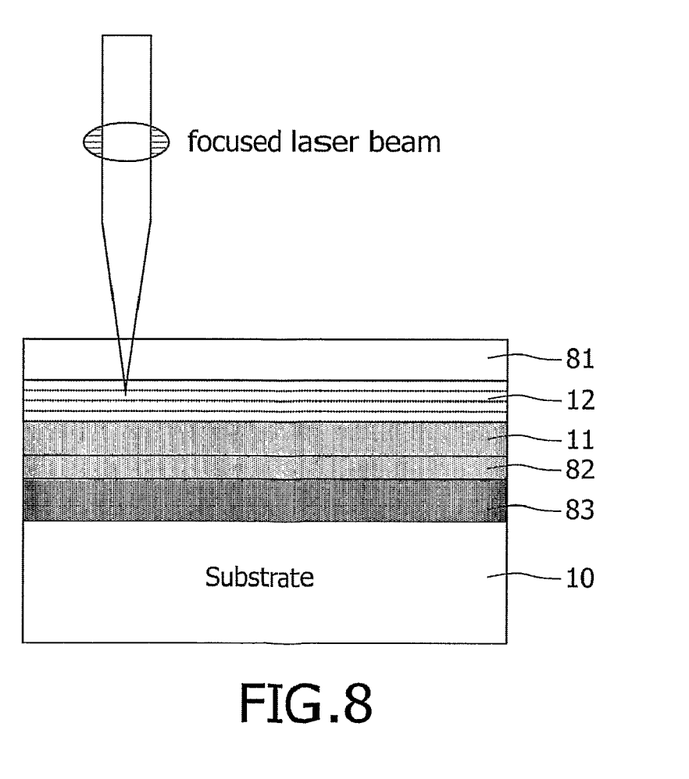
FIG. 8 shows the layout of a preferred master substrate.

The layout of an improved master substrate is given in FIG. 8. The recording stack comprises the information layer (12) based on fast-growth phase-change materials, an interface layer (11), a second interface layer (82), a metallic heat sink layer (83) and a protection layer (81) on top of the information layer. The metal heat sink layer is added to control the heat accumulation during writing of data and grooves. In particular if marks are written by amorphisation of the phase-change material, it is important that heat is quickly removed from the information layer during recording to enable melt-quenching of the phase-change material. The protection layer is added to prevent large-scale migration of molten phase-change material under influence of centrifugal forces during rotation of the master substrate. The protection layer should be resistant to the high recording temperature of around 600-700 C in case of amorphous writing. Furthermore, the protection layer should be removable to form the relief structure in the information layer and possibly in the interface layer (11) as well.

Figure 9:
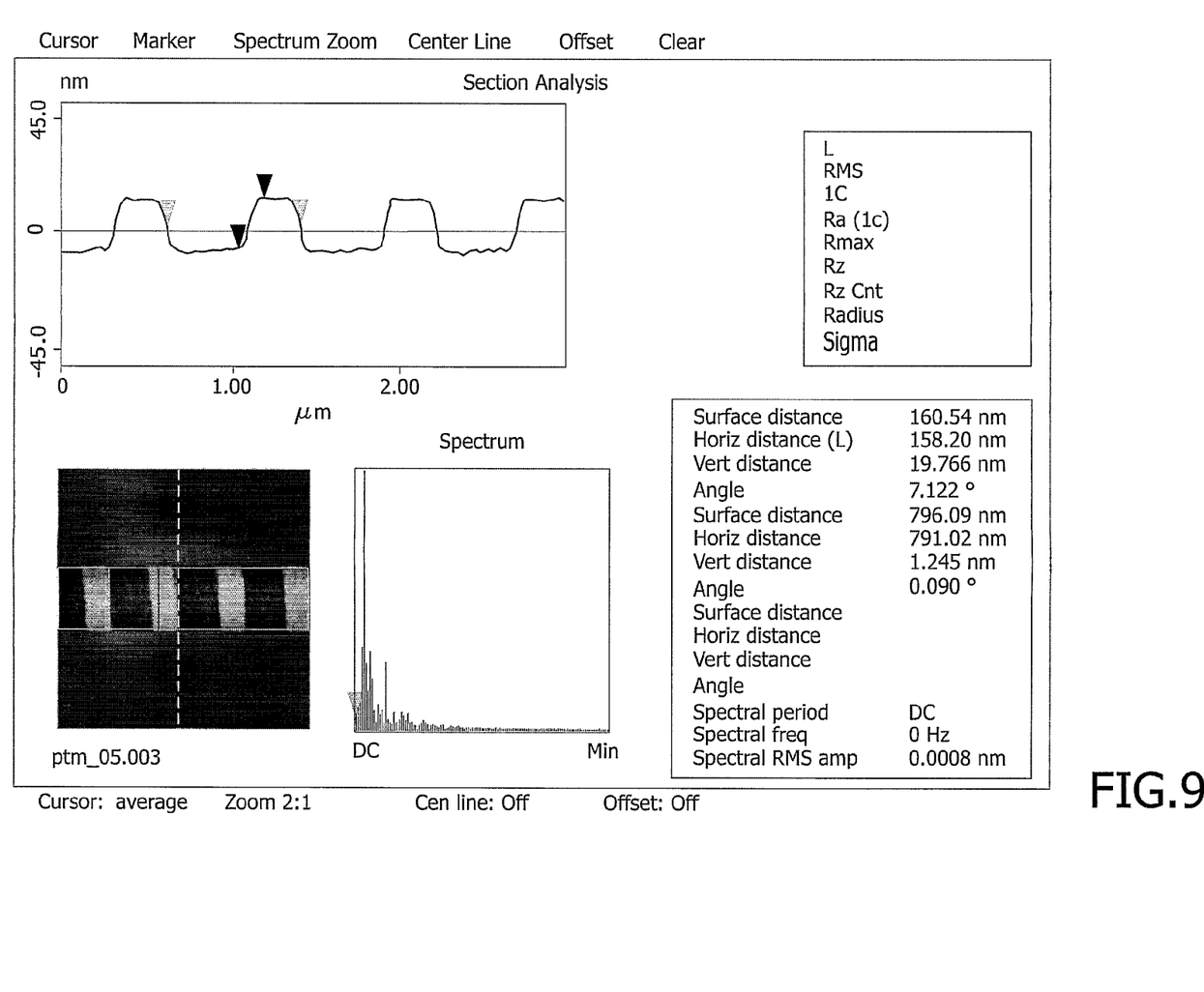
FIG. 9 shows a groove structure made with the proposed master substrate and according to the proposed method.

Grooves made with the proposed master substrate and according to the proposed method are shown in FIG. 9. The grooves are written at a groove track pitch of 740 nm with a laser beam recorder, which was operated at a laser light wavelength of 413 nm and had an objective lens with numerical aperture of NA=0.9. The total dissolution time was 10 minutes in 20% NaOH solution. The resulting groove depth was 19.8 nm.

Figure 10:
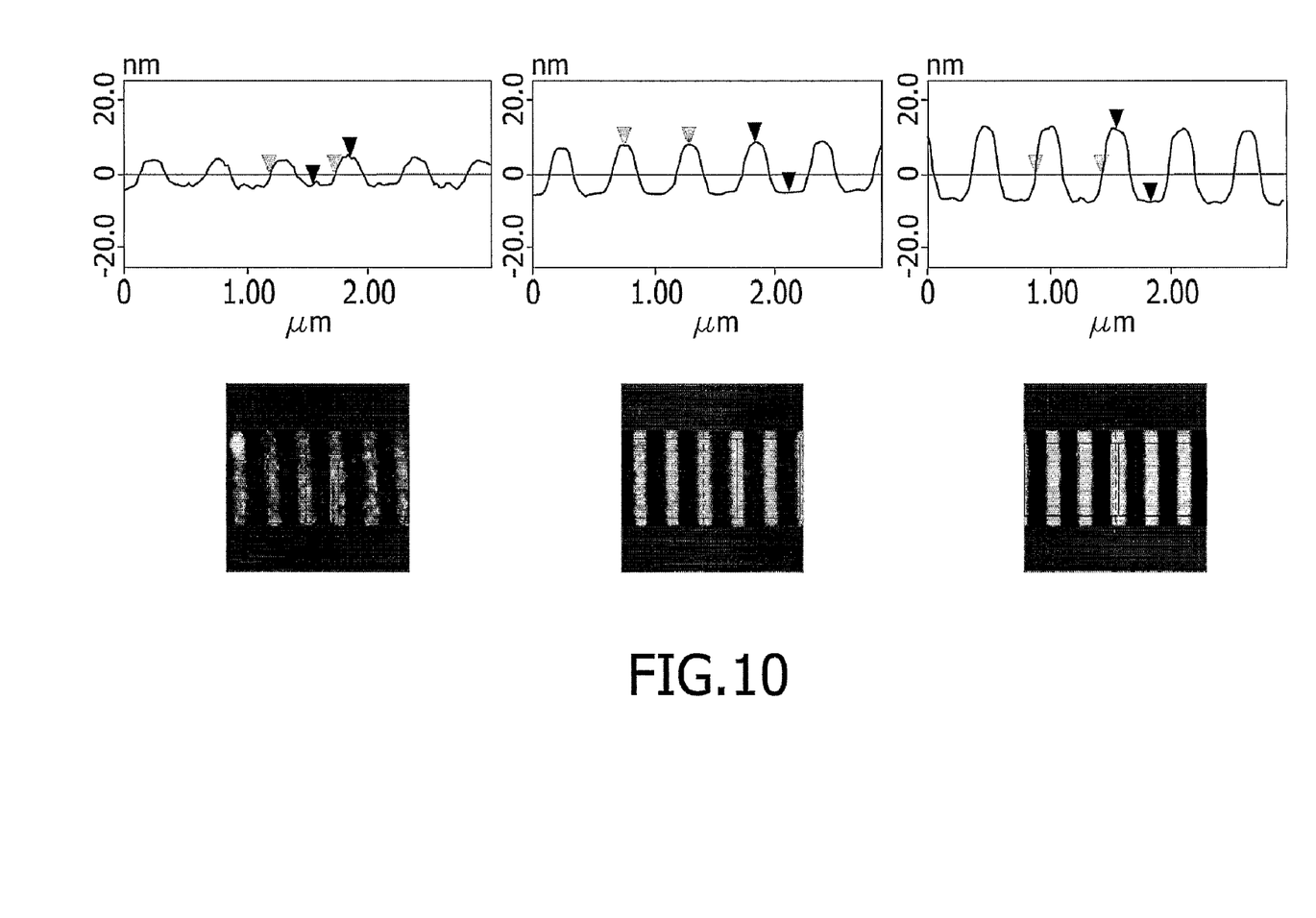
FIG. 10 shows three relief structures obtained for one laser power but immersed at different times in 10% NaOH solution.

Another example of grooves made with the proposed master substrate and proposed method are shown in FIG. 10. Three different phases of the dissolution process are shown, namely the result after 5 (left image), 10 (middle image) and 15 (right image) minutes immersion in 10% NaOH. The grooves are written at a groove track pitch of 500 nm with a laser beam recorder which operates at a laser light wavelength of 413 nm and a numerical aperture of the objective lens of NA=0.9. The resulting groove depth was 20 nm after 15 minutes immersion.

Figure 11:
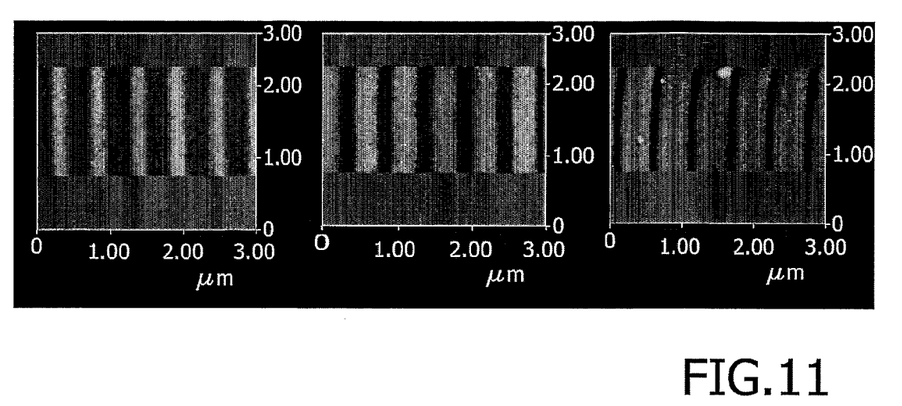
FIG. 11 shows three relief structure obtained for three different laser powers at 10 minutes immersion in 10% NaOH solution.

Grooves written with different laser power of the LBR are shown in FIG. 11. The left image shows the result obtained at low laser power, the middle image shows the result obtained at medium laser power and the right image shows the result obtained at high laser power. The total dissolution time was 10 minutes with a 10% NaOH solution. The figure illustrates that the proposed master substrate and method enable the formation of grooves with different groove widths. The lowest power illustrates that a groove of width 160 nm can be written with a 413 nm LBR and NA=0.9, enabling the making of master substrates for replication of 25 GB Blu-ray Disc RE (re-writable) and R (write-once) discs. The track pitch of the pre-recorded groove is TP=320 nm. A groove width of 160 nm gives a groove/land duty cycle of 50%. The width of the grooves can be further reduced if a laser beam recorder with 257 nm was used. A smaller optical spot will give a smaller thermal spot and therefore narrower written grooves. The smaller spot will also facilitate the writing of smaller marks, and therefore will lead to higher data densities.

Figure 12:
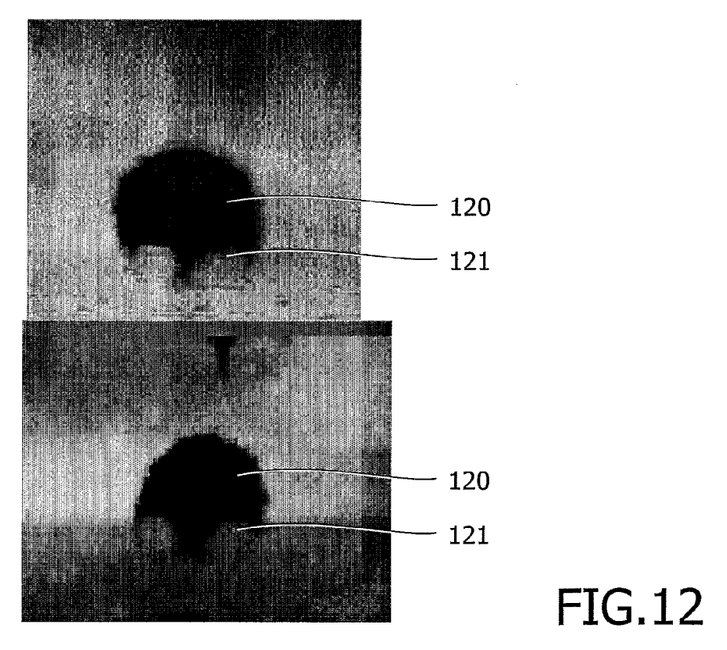
FIG. 12 shows AFM pictures of a short pit written with the proposed master substrate and according to the proposed method.

AFM pictures of a short pit written with the proposed master substrate and according to the proposed method are given in FIG. 12. The total dissolution time was 10 minutes in 10% NaOH solution. The pit is denoted with (120). The pit shape resembles the typical crescent shape of the shortest marks shown in FIG. 2. The pit width is almost twice the length of the pit. The pit length is reduced via the re-crystallization effect in the tail of the pit (121). The crescent shape of the mark is perfectly transferred to the relief structure. The depth of the pit was 20 nm in this case.

The examples illustrate that fast-growth phase-change materials possess a high contrast in dissolution rate between the amorphous and the crystalline phase. This contrast in dissolution rate can be utilized to make a high-density relief structure in the information layer. The interface layer acts as a natural barrier to etching since it is designed to have a very low or zero dissolution rate for the used developer liquids, such as alkaline or acid liquids. A high-density relief structure in the form of pre-grooves can be used as stamper for the replication of recordable (R) and rewritable (RE) optical discs. A high-density relief structure in the form of pre-pits can be used as stamper for the replication of pre-recorded read-only memory (ROM) discs. In particular in the latter case, the typical crescent shapes that result from writing in fast-growth phase-change materials, are present in the high-density relief structure, and eventually will be transferred into the optical ROM disc via replication.

The proposed master substrate with protection layer is also perfectly suited for mastering with liquid immersion. Liquid immersion mastering is a mastering concept to increase the numerical aperture of the objective lens to above 1. Water is present as an intermediate medium in between the objective lens and the master substrate instead of air. Water has a higher index of refraction (n) than air. In the preferred mastering method, a temperature increase of at least 500-800 is required to induce melting of the phase-change layer. In particular in case a liquid film is present on top of the phase-change layer, a significant amount of heat will be lost through the liquid film. This heat loss leads to:

1) a very higher laser power for recording data. In most laser beam recorders, the available laser power is limited. Therefore, a significant heat loss is not permitted.
2) broadening of the thermal write spot. This is explained from the lateral heat spreading due to the presence of a good thermal conductor in the vicinity of the information layer. The size of the focused laser spot is determined by the optics of the system.

This focused laser spot causes laser-induced heating by the absorption of photons in the recording stack. In case a good thermal conductor is present in the vicinity of the information layer, lateral spreading will cause a broadening of the temperature distribution. Since the proposed method is based on thermally induced phase transitions, this temperature broadening leads to larger marks and leads to a reduced data density.

The proposed protection layer acts as a good insulator, preventing the heat loss from the information layer. In case such a protection layer is applied, the optical spot resembles almost the thermal spot such that small marks can be written. The thermal conductivity of the proposed organic protection layers is between 0.2 and 0.4 W/mK.

An additional advantage is the protection against water of the information layer. The protection layer can be seen as a seal during liquid immersion mastering.

The invention claimed is:

1. A master substrate comprising a substrate layer and a recording stack deposited on the substrate layer, the recording stack comprising:
   an information layer, said first information layer comprising a growth-dominated phase-change material for forming marks and spaces representing an encoded data pattern,
   a first interface layer sandwiched between said information layer and the substrate,
   wherein said recording material is an alloy comprising at least two materials of the group of materials containing Ge, Sb, Te, In, Se, Bi, Ag, Ga, Sn, Pb, As, and
   a second interface layer acting as a barrier to etching, said second interface layer being sandwiched between said information layer and the substrate,
   wherein the recording stack further comprises a protection layer adjacent the information layer at a side most remote from the substrate wherein said protection layer comprises an organic material, and a metal heat sink layer sandwiched between said substrate layer and said first interface layer or second interface layer.

2. A master substrate as claimed in claim 1, wherein said recording material is a Sb—Te alloy material.

3. A master substrate as claimed in claim 1, wherein said recording material is a Sn—Ge—Sb-alloy material.

4. A master substrate as claimed in claim 1, wherein said information layer has a thickness in the range from 2 nm to 100 nm, preferred range 1 ranges between 5 and 40 nm, preferred range 2 ranges between 45 and 70 nm.

5. A master substrate as claimed in claim 1, wherein said first interface layer is made of a material of the group of dielectric materials containing ZnS—SiO$_2$, Al$_2$O$_3$, SiO$_2$, Si$_3$N$_4$.

6. A master substrate as claimed in claim 1, wherein said first interface layer comprises at least one organic dye selected from the group phthalo-cyanine, cyanine and AZO dyes.

7. A master substrate as claimed in claim 1, wherein said first interface layer comprises an organic layer selected from the group UV-cured organic materials.

8. A master substrate as claimed in claim 1, wherein said first interface layer has a thickness in the range from 5 nm to 100 nm.

9. A master substrate as claimed in claim 1, wherein said protection layer has a thickness between 2 and 50 nm.

10. A master substrate as claimed in claim 1, wherein said protection layer is made of the group materials containing ZnS—SiO$_2$, Al$_2$O$_3$, SiO$_2$, Si$_3$N$_4$, Ta$_2$O, SiC.

11. A master substrate as claimed in claim 1, wherein said protection layer comprises an organic material, in particular selected from the group Diazonaphthoquinone-based photoresists.

12. A master substrate as claimed in claim 1, wherein said second interface layer has a thickness between 10 and 100 nm.

13. A master substrate as claimed in claim 1, wherein said metal heat sink layer (83) has a thickness larger than 5 nm, in particular larger than 15 nm.

14. A master substrate as claimed in claim 1, wherein said metal heat sink layers comprises a material selected from the group of materials Al, Ag, Cu, Ag, Ir, Mo, Rh, Pt, Ni, Os, W and alloys thereof.

15. A method of manufacturing a stamper for replicating a high-density relief structure comprising at least the steps of:
illuminating a master substrate as claimed in claim 1 with a modulated focused radiation beam,
rinsing the illuminated master substrate layer with a developer, being one of an alkaline or an acid liquid, preferably selected of the group of solutions of NaOH, KOH, HCL and HNO3 in water, such that a desired relief structure results,
sputter-deposition of a metallic layer, in particular a Nickel layer,
galvanically growing the sputter-deposited layer to the desired thickness forming a stamper,
separating the master substrate from the stamper.

16. A method as claimed in claim 15 using a master substrate as claimed in claim 1, the information layer having a thickness in the range 5-35 nm wherein a pre-grooved shaped relief structure is formed for replication of write-once and rewritable optical discs.

17. A method as claimed in claim 15, in which the developer solution is used in a concentration 1-30%.

18. A pre-recorded optical disc replicated with the stamper manufactured with the method of claim 15, wherein the relief structure on the stamper surface comprises shortest pits having a typical crescent and longer pits having a swallow-shaped trailing edge and that the relief structure is replicated in the optical disc.

19. A master substrate as claimed in claim 11, wherein said interface layer comprises an organic layer made from hexandioldiacrylate (HDDA).

20. A method as claimed in claim 17, in which the developer solution is used in a concentration between 2 and 20%.

21. A master substrate as claimed in claim 1, wherein said second interface layer has a thickness between 15 and 50 nm.

22. A master substrate as claimed in claim 1, wherein said protection layer has a thickness between 5 and 30 nm.

23. A master substrate as claimed in claim 1, wherein said first interface layer has a thickness in the range between 20 and 70 nm.

24. A master substrate as claimed in claim 1, wherein said recording material has a composition of $Sn_{18.3}$—$Ge_{12.6}$—$Sb_{69.2}$.

25. A master substrate as claimed in claim 1, wherein said recording material is Sb$_2$Te doped with Ge and In.

26. A master substrate as claimed in claim 1, wherein said information layer has a thickness in the range from between 5 and 40 nm.

27. A master substrate as claimed in claim 1, wherein said information layer has a thickness in the range from between 45 and 70 nm.

28. A master substrate as claimed in claim 1, wherein said protection layer comprises an organic material, in particular selected from the group of soluble organic materials, like PMMA.

* * * * *